United States Patent [19]

Sullivan et al.

[11] Patent Number: 5,342,889
[45] Date of Patent: Aug. 30, 1994

[54] CHAIN EXTENDED LOW MOLECULAR WEIGHT POLYOXIRANES FOR ELECTROSTATIC APPLICATIONS

[75] Inventors: Francis R. Sullivan, Cleveland Heights; Elaine A. Mertzel, Rocky River; Edmond G. Kolycheck, Lorain, all of Ohio

[73] Assignee: The B. F. Goodrich Company, Akron, Ohio

[21] Appl. No.: 729,865

[22] Filed: Jul. 10, 1991

Related U.S. Application Data

[63] Continuation-in-part of Ser. No. 461,606, Jan. 5, 1990, abandoned.

[51] Int. Cl.$^5$ .................. C08L 27/06; C08L 75/08
[52] U.S. Cl. .................. 525/127; 525/129; 525/130; 525/131; 525/458; 525/932; 524/910; 528/76
[58] Field of Search .......... 525/458, 127, 129–131, 525/932; 528/76; 524/910

[56] References Cited

U.S. PATENT DOCUMENTS

| | | | |
|---|---|---|---|
| 2,948,691 | 8/1960 | Windemuth et al. | 525/127 |
| 3,425,981 | 2/1969 | Puletti et al. | 260/41 R |
| 3,625,915 | 12/1971 | Meurchin et al. | 260/41 R |
| 3,706,710 | 12/1972 | Camilleri et al. | 260/75 NE |
| 3,810,956 | 5/1974 | Kimura et al. | 525/430 |
| 3,876,725 | 4/1975 | Wells et al. | 260/858 |
| 3,882,190 | 5/1975 | Wells | 260/857 P |
| 3,887,644 | 6/1975 | Wells | 260/857 P |
| 3,923,924 | 12/1975 | Wells et al. | 260/830 P |
| 4,051,196 | 9/1977 | Wells et al. | 260/78 |
| 4,093,676 | 6/1978 | Weipert et al. | 260/857 |
| 4,159,975 | 7/1979 | Praetorius et al. | 525/91 |
| 4,291,134 | 9/1981 | Hambrecht et al. | 525/92 |
| 4,379,913 | 4/1983 | Waitkus | 528/300 |
| 4,408,013 | 10/1983 | Barnhouse | 525/187 |
| 4,499,124 | 2/1985 | Pusineri et al. | 427/385.5 |
| 4,543,390 | 9/1985 | Tanaka et al. | 525/63 |
| 4,588,773 | 5/1986 | Federl et al. | 525/64 |
| 4,670,330 | 6/1987 | Ishiwata | 528/71 |
| 4,719,263 | 1/1988 | Barnhouse et al. | 525/187 |
| 4,751,118 | 6/1988 | Wypart et al. | 428/35 |
| 4,767,671 | 8/1988 | Parker et al. | 528/76 |
| 4,775,716 | 10/1988 | Kipouras et al. | 525/64 |
| 4,857,590 | 8/1989 | Gaggar et al. | 525/64 |
| 4,906,681 | 3/1990 | Wozniak | 524/314 |
| 4,912,142 | 3/1990 | Vermeulen et al. | 521/105 |
| 4,931,506 | 6/1990 | Yu | 525/187 |
| 4,990,357 | 2/1991 | Karakelle et al. | 525/125 |
| 5,077,330 | 12/1991 | Ehrhart et al. | 525/129 |

FOREIGN PATENT DOCUMENTS

| | | | |
|---|---|---|---|
| 0303489 | 2/1989 | European Pat. Off. | |
| 0018656 | 2/1978 | Japan | 525/129 |
| 5318656 | 2/1978 | Japan | |
| 0157861 | 9/1983 | Japan | 525/127 |
| 63-309552 | 12/1988 | Japan | |
| 63-312342 | 12/1988 | Japan | |
| 8903860 | 5/1989 | World Int. Prop. O. | 525/131 |

OTHER PUBLICATIONS

A. McLennaghan, A. Hooper and R. Pethrick, Eur. Polym. J. (1988), 25, 1297–1302.

A. McLennaghan and R. Pethrick, Eur. Polym. J. (1988), 24, 1063–1071.

*Primary Examiner*—James J. Seidleck
*Assistant Examiner*—Thomas Hamilton, III
*Attorney, Agent, or Firm*—Helen A. Odar

[57] ABSTRACT

The present invention relates to electrostatic dissipative polymeric compositions comprising an effective amount of a chain extended polymer and a matrix polymer or matrix polymer blend. The chain extended polymer of the subject invention has electrostatic dissipative properties and is formed from low molecular weight polyethers which are reacted with a chain extender to furnish a useful additive.

30 Claims, No Drawings

CHAIN EXTENDED LOW MOLECULAR WEIGHT POLYOXIRANES FOR ELECTROSTATIC APPLICATIONS

This patent application is a continuation-in-part of U.S. patent application Ser. No. 07/461,606 filed on Jan. 5, 1990 entitled "Chain Extended Low Molecular Weight Polyoxiranes for Electrostatic Applications" now abandoned.

FIELD OF THE INVENTION

This invention relates to new electrostatic dissipating additives based on low molecular weight polyether oligomers which have been reacted with a chain extender to form a high molecular weight polymeric material. These chain extended polymers when used in concert with other polymeric materials do not significantly impair the physical properties of the new polymeric composition.

These chain extended polymers additives are also stable at high processing temperatures and do not cause blooming in the finished product. The present invention also relates to plastic articles which are formed from the new polymeric composition containing the chain extended polymer additives.

BACKGROUND OF THE INVENTION

The formation and retention of charges of static electricity on the surface of most plastics is well known. Plastic materials have a significant tendency to accumulate static electrical charges due to low electrical conductivity. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal.

The increasing complexity and sensitivity of microelectronic devices makes the control of static discharge of particular concern to the electronic industry. Even a low voltage discharge can cause severe damage to sensitive devices. The need to control static charge buildup and dissipation often requires the total assembly environment to be constructed of partially conductive materials. It also may require electrostatic protective packages, tote boxes, casings, and covers be made from conductive polymeric materials to store, ship, protect, or support electrical devices and equipment.

The prevention of the buildup of static electrical charges which accumulate on plastics during manufacturing or use has been prevented by the use of various electrostatic dissipative (ESD) materials. These materials can be applied as a coating which may be sprayed or dip coated on the article after manufacture although this method usually results in a temporary solution. Alternatively these materials can be incorporated into the polymer during processing thereby providing a greater measure of permanence. However, the incorporation of these lower molecular weight electrostatic dissipative materials (antistatic agents) into the various polymers has its own limitations. For example, during the hot temperatures required during conventional processing many of the antistatic agents cannot withstand high temperatures and are damaged or destroyed, thereby being rendered useless with respect to their ESD properties. Also, many of the higher molecular weight ESD agents are not miscible with the matrix polymers employed, and if the refractive indices differ by more than about 0.02, there can be a substantial reduction in the transparency of the composition. These compositions may be unacceptable for transparent applications. For example, in an immiscible polymer blend where the dispersed phase particle size is greater than 0.1 micron the smaller the difference in the refractive indices between the additives and the matrix polymer the greater the clarity of the article made from the mixture.

A large number of antistatic agents are also either cationic or anionic. These tend to cause the degradation of plastics, particularly PVC, and result in discoloration or loss of physical properties. Other antistatic agents have significantly lower molecular weights than the matrix polymers themselves. Often these lower molecular weight antistatic agents possess undesirable lubricating properties and are difficult to incorporate into the polymer. Incorporation of the lower molecular weight antistatic agents into the polymers often will reduce the moldability of the matrix plastic because the antistatic agents can move to the surface of the plastic during processing and frequently deposit a coating on the surface of the molds, possibly destroying the surface finish on the articles of manufacture. In severe cases, the surface of the article of manufacture becomes quite oily and marbleized. Additionally, the lower molecular weight ESD agents often tend to lose their ESD capability due to evaporation, develop undesirable odors, and can promote stress cracking or crazing on the surface of an article in contact with the article of manufacture.

One of the known lower molecular weight antistatic agents is a homopolymer or copolymer oligomer of ethylene oxide. Generally, use of the lower molecular weight polymers of ethylene oxide or polyethers as antistatic agents are limited by the above-mentioned problems relative to lubricity, surface problems, or less effective ESD properties. Further, these low molecular weight polymers can be easily extracted or abraded from the matrix polymer thereby relinquishing any electrostatic dissipative properties.

There are several examples of high molecular weight electrostatic dissipative agents in the prior art. In general these additives have been high molecular weight polymers of ethylene oxide or a derivative thereof like propylene oxide, epichlorohydrin, glycidyl ethers and the like. It has been a requirement that these additives be high molecular weight materials to overcome the problems mentioned above. However, these prior art ESD additives result in articles having high haze values and thus are not transparent enough for some end uses.

Prior to the present invention the utilization of low molecular weight polyether oligomers as antistatic agents was impractical as these low molecular weight oligomers suffer from problems such as blooming.

SUMMARY OF THE INVENTION

The present invention relates to a chain extended polymer having electrostatic dissipative properties. The chain extended polymer is formed from low molecular weight polyethers which are reacted with a chain extender to furnish a useful additive. Many of these low molecular weight commercially available polyether materials without being chain extended would not be useful as anti-static agents because of their negative effects on the matrix polymers.

These low molecular weight polyether materials often have functional groups which are capable of acting as sites for chain extension. In a preferred form the polyether will have two (2) functional groups. It has been found that when the low molecular weight polyethers are reacted with a chain extender that the resulting polymers will be of high molecular weight. The chain extended polymers of this invention can be modified by varying the molecular weight of the polyether oligomer or the nature of the chain extender so that the physical, electrical, or optical properties can be tailored for specific applications. For example, the index of refraction of an ESD polymer can then be matched to that of a matrix polymer thereby providing a clear composition. Further, the properties of the chain extended polymer of this invention can be altered by the addition of a modifier. The present invention also relates to electrostatic dissipative polymeric compositions comprising an effective amount of the chain extended polymer mixed with a matrix polymer. The chain extended polymer is effective as a static dissipative in the range of from about 3 parts to about 100 parts by weight per 100 parts by weight of the matrix polymer in the polymeric composition.

The present invention further relates to a process for preparing the electrostatic dissipative polymeric compositions by adding to a matrix polymer an effective amount of the chain extended polymer.

DETAILED DESCRIPTION OF THE PREFERRED EMBODIMENTS

The present invention relates to a chain extended polymer having electrostatic dissipative properties comprising (A) a low molecular weight polyether oligomer having two reactive moieties and an average molecular weight from about 200 to about 10,000 wherein the oligomer is a homopolymer or a copolymer of two or more copolymerizable cyclic ether monomers having the formula:

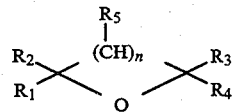

wherein $R_1$, $R_2$, $R_3$, $R_4$, and $R_5$ are independently hydrogen, unsubstituted or substituted alkyl, cycloalkyl, cycloalkenyl, aryl, aralkyl or alkaryl, the substituents are $OR_6$, $SR_6$, CN or halogens, $R_6$ is hydrogen, alkyl, cycloalkyl, cycloalkenyl, aryl, aralkyl, alkaryl, or carboxyl, the reactive moieties are OH, $NH_2$, or $NHR_6$, n is 0, 1, 2, or 4; (B) from about 0 moles to about 35 moles of a modifier for each mole of low molecular weight polyether and (C) a chain extender; with the proviso that the number of moles of chain extender per mole of the sum of the number of moles of low molecular weight polyether oligomer plus the number of moles of modifier is from about 0.95 to about 1.06. In a preferred embodiment the number of moles of chain extender per mole of the sum of the number of moles of low molecular weight polyether oligomer plus the number of moles of modifier is from about 0.97 to about 1.03. By low molecular weight oligomer, it is meant that the polyether will have an average molecular weight from about 200 to about 10,000 and preferably from about 500 to about 5000, as determined by end group analysis. The reaction of the low molecular weight oligomer with a chain extender will furnish a chain extended polymer having melt indices from 0.05 to 110 grams per ten minutes. The preferred melt index range of the chain extended polymer will be from about 1.0 to 65 grams/10 minutes. The melt index is determined according to ASTM D-1238 Procedure A at a barrel temperature of 190° C. and an 8700 gram piston load.

The present invention does not contemplate incorporation of amines or ammonium groups into the compositions. For matrix polymers such as polyvinyl chloride the presence of amines or ammonium groups is undesirable as these groups are known to be detrimental to these polymer compositions. When PVC compositions which contain these groups are heated they will discolor.

In a preferred embodiment the low molecular weight oligomer employed is a polymer of cyclic ether monomers having the formula:

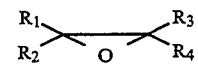

In a more preferred embodiment the low molecular weight oligomer employed is a polymer of cyclic ether monomers wherein $R_1$, $R_2$ and $R_3$ are hydrogen and $R_4$ is H, $CH_3$, or $CH_2X$ wherein X is a halogen, $OR_6$, or $COOR_6$, and $R_6$ is as defined hereinabove.

The most preferred cyclic ether is ethylene oxide.

In an alternative embodiment the low molecular weight polyether oligomer is end capped with ethylene oxide or ethylene imine thereby providing an oligomer which will have two primary moieties.

The alkyl groups can have from 1 to 6 carbon atoms, be straight or branched chain and may be unsubstituted or substituted. The alkenyl groups can have from 1 to 6 carbon atoms, be straight or branched chain, have 1 or two double bonds and be unsubstituted or substituted.

The cycloalkyl and cycloalkenyl groups can have from 3 to 8 ring carbon atoms and from 1 to 3 rings. The cycloalkenyl groups can have 1 or 2 double bonds.

The aryl groups can have from 6 to 10 ring carbon atoms and one or two rings.

Useful polyether oligomers are linear polymers having the general formula:

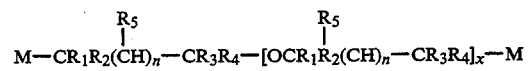

wherein X+1 is the number of repeating ether units, each M is a reactive moiety, n is 0,1,2, or 4 and $R_1$, $R_2$, $R_3$, $R_4$ and $R_5$ are as defined hereinabove. The most common M is the OH group. For the subject invention X+1 is at least 4 and between 4 and about 250. On a molecular weight basis, the useful range of polyether oligomers have an average molecular weight from about 200 to 10,000 and preferably from about 500 to 5000. Commercially available polyethylene glycols useful in this invention are typically designated as polyethylene glycol 600, polyethylene glycol 1450, and polyethylene glycol 4000.

The polyether oligomer can be a homopolymer or a copolymer of two or more copolymerizable monomers. Some examples of monomers are ethylene oxide, propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

The present invention also relates to electrostatic dissipative polymeric compositions comprising an effective amount of the chain extended polymer and a matrix polymer or matrix polymer blend, wherein said composition will be essentially free of amine or ammonium groups. The chain extended polymer is effective as a static dissipative in the range of from about 3 parts to about 100 parts by weight wherein the total of the matrix polymer or polymer blend is 100 weight parts. In a preferred form the composition can have from about 5 parts to about 35 parts of the chain extended polymer per 100 parts by weight of the matrix polymer or matrix polymer blend.

There are several applications for electrostatic dissipative materials which have a high degree of clarity. It is well known in the art that the matching of the refractive index of two or more polymers in an immiscible polymeric blend is generally required to achieve a high degree of clarity. The requirements for transparent materials are dependent upon the thickness of the specimen. Generally, for transparent applications the refractive indices of the components of the polymeric composition can differ from about 0.01 to about 0.1. In a preferred form the difference in refractive indices will be about 0.02. In general, if the refractive index between the two materials differs by more than 0.02, there is a substantial reduction in the transparency of the composition. Refractive indices are measured using a film having a thickness of about 0.5 mm or less and the sodium D line on standard equipment, well known in the art.

It has been found that altering the percentage of the polyether oligomer in the chain extended polymer can cause the refractive index of the polymer to be changed. The desired percent of oligomer in the chain extended polymer will depend upon the molecular weight of the oligomer, the chain extender, the modifier, if implemented, and the matrix polymer employed. The percentages may be different for various matrix polymers and can be determined by experimentation.

The clarity of the composition will further depend upon amount of the ESD additive in the composition. In the preferred composition the difference between the refractive index of the chain extended polymer and the matrix polymer blend is 0.02 or less.

The present invention also relates to a clear polyvinyl chloride composition comprising polyvinyl chloride and an effective amount of an electrostatic dissipative additive said composition having the following electrical properties:
  (a) surface resistivity of less than about $1 \times 10^{14}$ Ohms/sq, as measured according to ASTM D-257; or
  (b) volume resistivity of less than about $1 \times 10^{14}$ Ohms-cm, as measured according to ASTM D-257.

Clarity can be defined as follows:
  (I) a percent light transmission greater than 50% for 20 mil film as measured according to ASTM D-1003-61; and
  (II) a percent haze value less than 60% for a 20 mil film as measured using a Hunterlab model D-54P-5 spectrophotometer or equivalent.

The spectrophotometer was calibrated with haze standards having nominal values of 5 and 10, Part No. HG-1214, as supplied by Gardner Laboratory Division, Bethesda, Md.

In a preferred embodiment the surface resistivity will be less than about $1 \times 10^{13}$ Ohms/sq, and the volume resistivity will be less than about $1 \times 10^{13}$ Ohms-cm. In the most preferred embodiment the surface resistivity of composition will be less than about $1 \times 10^{12}$ ohms/sq, and the volume resistivity less than about $1 \times 10^{12}$ Ohms-cm. The preferred light transmission is greater than 70% for a 20 mil film as measured according to ASTM D-1003-61; and the preferred haze value is less than 30% for a 20 mil film. The most preferred light transmission is greater than 80% for a 20 mil film as measured according to ASTM D-1003-61; and the most preferred haze value is less than 20% for a 20 mil film. Surface and volume resistivity testing is conducted in accordance with ASTM D257. An adapter compresses an upper electrode and a lower circular electrode encircled with a ringing electrode. A sheet sample (3.5 inches in diameter and ⅛–1/16 inch thick) was placed between the upper and lower electrodes, and a voltage of 500 volts was applied between the electrodes. After 60 seconds, the resistance was recorded using an ohmmeter and converted into surface resistivity in Ohms/square or volume resistivity in Ohms-cm. The static decay test is carried out in accordance with Federal Test Method Standard 101B, Method 4046.1, "Electrostatic Properties of Materials" with a Static Decay Meter, model 406C obtained, from Electro-Tech Systems, Inc. Static decay is a measure of the ability of a material, when grounded, to dissipate a known charge that has been induced on the surface of the material. A sheet sample (3"×6") with ⅛–1/16 inch thickness is placed between clamp electrodes contained in a Faraday cage. A 5,000 volt positive charge is applied to the surface of the specimen and the time in seconds required to dissipate the charge to 500 volts (10% of its initial value) or to 50 volts (1% of its initial value), after a ground is provided, is then measured. This test was run on unconditioned samples and on samples conditioned for 48 hours at 15% relativity humidity (RH).

The matrix polymer as defined herein can be a homopolymer or a copolymer for example, polyvinyl chloride, chlorinated polyvinyl chloride, copolymers of styrene and acrylonitrile, terpolymers of styrene, acrylonitrile, and diene rubber, copolymers of styrene and acrylonitrile modified with an acrylate elastomer, copolymers of styrene and acrylonitrile modified with ethylene propylene diene monomer rubber, polystyrene and rubber modified impact polystyrene, nylon, polycarbonate, thermoplastic polyesters including polybutylene terephthalate, polyethylene terephthalate and polyether-ester block copolymers, polyurethane, polyphenylene oxide, polyacetal, polymethyl methacrylate. The matrix polymer can be further blended with one or more other polymeric materials, e.g., another matrix polymer, along with the electrostatic dissipative additive or other additives known in the art.

Polyvinyl chloride, PVC, vinyl polymer, or vinyl polymer material, as used herein, refers to homopolymers and copolymers of vinyl halides and vinylidene halides and includes post halogenated vinyl halides such as CPVC. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one terminal $CH_2\!=\!C<$ grouping. As examples of such olefinic monomers there may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like; nitriles, such as acrylonitrile, methacrylonitrile, and the like; acrylamides, such as methyl acrylamide, N-methylol acrylamide, N-butyoxy methylacrylamide, and the like; vinyl ethers, such as ethyl vinyl ether, chloroethyl vinyl ether, and the like; the vinyl ketones; styrene and styrene derivatives, such as α-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 20% by weight, based on the weight of the monomer mixtures. Some copolymers have a tendency to decrease the clarity of the article and therefor the co-monomer amount in the copolymer should be minimized. The most preferred vinyl polymer, or resin, is polyvinyl chloride (PVC) homopolymer produced by the mass or suspension polymerization process and the invention, for simplicity and convenience, will be described in connection therewith, it being understood that this merely intended in an illustrative sense and not limitative. Articles of this invention may be made from resins produced by the suspension, mass, emulsion or solution processes.

In accordance with the present invention, the low molecular weight polyether oligomer intermediate and the non-hindered diisocyanate are co-reacted simultaneously in a one-shot polymerization process at a temperature above about 100° C. and usually about 120° C., whereupon the reaction is exothermic and the reaction temperature is increased to about 200° C. to 285° C.

At times, the polyether oligomer can be blended with a glycol or a diamine modifier before reaction with a diisocyanate. The glycol modifier may be any diol (i.e., glycol) or combination of diols, containing 2 to 10 carbon atoms, such as ethylene glycol, 1,3-propanediol, propylene glycol, 1,4-butanediol, 1,3-butanediol, 1,5-pentanediol, 1,6-hexanediol, diethylene glycol, 1,4-cyclohexane dimethanol, neopentyl glycol, hydroquinone bis(2-hydroxyethyl) ether, or any aliphatic or aromatic molecule containing two reactive hydroxyl groups. The preferred glycol modifier is 1,4-butanediol.

Further, the diamine modifiers can be any diamine or combination of diamines, containing 0 or 2 to 10 carbon atoms, such as hydrazine, ethylene diamine, 1,3-diamino-propane, aminoaniline and the like.

In general, for each mole of polyether oligomer employed, the amount of chain extender employed will be about 1.0 moles. If a glycol or diamine modifier is employed, the sum of the moles of the modifier plus the moles of polyether oligomer will be at a ratio of about 1.0 mole for each 1.0 mole of chain extender.

The hydroxyl or amino terminated polyols described above can be blended with a glycol or diamine modifier before the blend is reacted with a polyisocyanate or the polyol and the modifier can be brought to the reaction zone simultaneously. If desired, the polyol can be reacted with the diisocyanate, then the prepolymer is reacted with the modifier. Stabilizers such as antioxidants can be added prior to the reaction or during the reaction.

The amount of glycol or diamine modifier is generally from about 0 to about 35 moles and desirably from about 0 to about 20 moles for every mole of low molecular weight polyether oligomer. Generally, the number of moles of diisocyanate per total of the number of moles of the low molecular weight polyether oligomer plus the number of moles of modifier is from about 0.95 to about 1.06 and preferably from about 0.97 to about 1.03.

In an alternative procedure two or more of the polyether oligomers can be reacted with a chain extender to furnish an oligomer dimer or trimer. These dimers or trimers can then be chain extended under similar conditions to form the high molecular weight polymer. This procedure can be used to produce a high molecular weight chain extended polymer with varying chain extender groups.

Conventional chain extenders are molecules having two functional groups (reactive sites) which will react with the reactive moieties of the polyethers.

The reactive moieties typically occur at the ends of the polyether oligomers as a result of routine synthesis, however the reactive moieties can be located at locations other than the ends. Generally, these are hydroxyl groups, although this group may be substituted by any of several other reactive groups which can then react with another function group on the chain extender. The reactive moieties most useful for the present invention are OH, $NH_2$ and $NHR_6$. In a preferred form the reactive moieties are OH, $NH_2$ or $NHR_6$ and are on primary carbon atoms. The most preferred reactive moiety is OH.

Some examples of these chain extenders are organic diacids, acid derivatives, such as diesters, diacyl halides, and the like, diisocyanates or any other difunctional molecule or oligomer which can react with the polyether oligomer moieties. Some examples of useful diacid derivatives are diethyl or dimethyl esters of carbonic acid, oxalic acid, malonic acid, succinic acid, glutaric acid, adipic acid, pimelic acid, sebacic acid, phthalic acid, and the like. Acyl halides which are effective in this invention are acyl chlorides of carbonic acid, oxalic acid, malonic acid, succinic acid, glutaric acid, adipic acid, pimelic acid, sebacic acid, phthalic acid and the like.

Any conventional diisocyanate can be used, either aliphatic or aromatic. In a preferred embodiment diisocyanates are the chain extenders utilized. Suitable diisocyanates include, for example, 1,4-diisocyanatobenzene (PPDI), 4,4'-methylenebis(phenyl isocyanate) (MDI), 4,4'-methylenebis(3-methoxy phenyl isocyanate), 1,5-naphthalene diisocyanate (NDI), toluene diisocyanate (TDI), m-xylene diisocyanate (XDI), 1,4-cyclohexyl diisocyanate (CHDI), 1,10-diisocyanatonaphthylene, and 4,4'-methylenebis(cyclohexyl isocyanate) ($H_{12}$ MDI). The most preferred diisocyanate is MDI.

The subject invention contemplates the process for preparing an electrostatic dissipative polymeric composition comprising the steps of adding to a matrix polymer an effective amount of the chain extended polymer and mixing the polymers to produce the electrostatic dissipative composition.

The compositions of the present invention are useful for a variety of applications. Some examples are tubes, paper trays, floor tiles, machine housings, tote bins, and polymeric films.

Various conventional additives can be utilized in the compositions of the present invention. Thus, heat stabilizers, lubricants, heat distortion additives, impact modifiers, fire retardants, antioxidants, UV inhibitors, and processing aids generally employed for use in polymers, can be implemented. Moreover, plasticizers, such as those typically used and known to one skilled in the art can also be utilized. Various fillers and pigments can also be employed in conventional amounts. The amounts and types of additives, fillers and/or pigments required are well known to those skilled in the art.

EXAMPLES

The invention will now be illustrated by examples. The examples are not intended to be limiting of the scope of the present invention. In conjunction with the general and detailed description above, the examples provide further understanding of the present invention and demonstrates some of the preferred embodiments of the invention.

The following Example Nos. 1 to 5 describe the preparation of several chain extended polymers. Example 6 illustrates the methods for blending the chain extended polymer with a matrix polymer. The remaining Example Nos. 7 to 10 describe various compositions that were prepared and the results of tests, i.e., measurement of the electrical and optical properties, that were carried out to evaluate the materials.

In general, the examples described hereinbelow have been optimized for polyvinyl chloride. Further experimentation would allow an investigator to optimize the properties and get a chain extended polymer useful for any matrix polymer system.

EXAMPLE 1

Polyethylene glycol (Dow E-600), 0.2 moles (121 grams) having a molecular weight of 603 as determined by end group analysis was reacted with 0.201 moles (50.25 grams) of 4,4'-methylenebis(phenyl isocyanate) (MDI) by a standard high temperature random melt polymerization procedure. The polymerization procedure involved heating the polyether and MDI separately to about 100° C. and then mixing the ingredients. The reaction is exothermic and raises the temperature to about 200° to 285° C. in about 1 to 5 minutes, during which time polymerization takes place as evidenced by an increase in viscosity. The sample was molded into a plaque and the physical properties were measured. The sample had a volume resistivity of $4.9 \times 10^{10}$ Ohms-cm and a surface resistivity of $8.7 \times 10^{12}$ Ohms/sq.

EXAMPLE 2

Polyurethane 45

Polyethylene glycol (Dow E-1450), 0.2 moles (290 grams) having a molecular weight of 1450 as determined by end group analysis was blended at 60° C. with 0.844 moles (76,064 grams) of 1,4-butane diol. This blend or physical mixture was then reacted with 1.044 moles (26.27 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $5.4 \times 10^{10}$ Ohms-cm, a surface resistivity of $6.0 \times 10^{11}$ Ohms/sq and a refractive index of 1.551.

EXAMPLE 3

Polyurethane 56

Polyethylene glycol (Dow E-1450), 0.2 moles (278 grams) having a molecular weight of 1390 as determined by end group analysis was blended at 60° C. with 0.496 moles (44.6 grams) of 1,4-butane diol. This blend or physical mixture was then reacted with 0.696 moles (174 grams) of 4,4'-methylene-bis (phenyl isocyanate) (MDI) by a standard high temperature random melt polymerization procedure as described in Example 1. The sample was molded into a plaque and the physical properties were measured. The sample had a volume resistivity of $4.2 \times 10^{10}$ Ohms-cm and a refractive index of 1.541.

EXAMPLE 4

Polyurethane 64

Polyethylene glycol (Dow E-1450), 0.4 moles (580 grams) having a molecular weight of 1450 was blended at 60° C. with 0.667 moles (60 grams) of 1,4-butane diol. This blend or physical mixture was then reacted with 1.078 moles (269.5 grams) of 4,4'-methylene-bis(phenyl isocyanate) (MDI) by a standard high temperature random melt polymerization procedure as described in Example 1. The sample was molded into a plaque and the physical properties were measured. The sample had a volume resistivity of $3.6 \times 10^9$ Ohms-cm, a surface resistivity of $4.7 \times 10^{10}$ Ohms/sq, and a refractive index of 1.529.

EXAMPLE 5

Polyurethane 72

Polyethylene glycol (Dow E-1450), 0.3 moles (426 grams) having a molecular weight of 1420 as determined by end group analysis was blended at 60° C. with 0.267 moles (24 grams) of 1,4-butane diol. This blend or physical mixture was then reacted with 0.564 moles (141 grams) of 4,4'-methylene-bis (phenyl isocyanate) (MDI) by a standard high temperature random melt polymerization procedure as described in Example 1. The sample was molded into a plaque and the physical properties were measured. The sample had a volume resistivity of $9.5 \times 10^9$ Ohms-cm and a refractive index of 1.518.

EXAMPLE 6

Mixing Procedures

A. Compression Molding

In a Waring blender, 115 g of polyvinyl chloride resin, 3.45 g of organotin stabilizer, and about 2.0 g of an antioxidant were blended. To this mixture was added 23.0 g of the chain extended polymer of Example 2 (polyurethane 45). This was then milled to a uniform blend on a two roll mill at 340°–350° F. for approximately 5–10 minutes. The mixture was removed from the mill and compression molded at 356° F. to produce a uniform plaque from which electrical and static decay results were measured. This example represents a formulation having 20 phr of chain extended polymer in polyvinyl chloride resin.

B. Injection Molding

The following ingredients, 1557 g of polyvinyl chloride resin, 47.3 g of an organotin stabilizer, 31.6 g an antioxidant and 7.9 g of a lubricant were mixed in a Henschel mixer for 2–3 minutes. The mixture was then placed on a two roll mill at 320°–330° F. and 473.3 g of polyurethane 45 was added and the whole was milled for 10–15 minutes. The milled sheet was granulated, and then injection molded at 370°–395° F. Surface resistivity of the molded plaques was $4.8 \times 10^{11}$ Ohms/sq and volume resistivity was $2.6 \times 10^{11}$ Ohms-cm. Static decay results are given in Table I.

EXAMPLE 7

The chain extended polymer of Example 2 (polyurethane 45) was compression molded into plaques. The static decay and volume resistivity was then measured. Also, several blends, i.e. different loadings of polyurethane 45 in PVC were prepared and compression molded the static decay rates were measured after being conditioned for 48 hours at 15% relative humidity (RH) and unconditioned. These results are summarized in Table I. The volume resistivity of the plaques was also measured. These results are summarized in Table II.

TABLE I

| PVC Matrix Polymer Unconditioned Parts by Wt. | Polyurethane 45 Parts by Wt. | STATIC DECAY Seconds | | | |
|---|---|---|---|---|---|
| | | 15% RH | | | |
| | | 10% | 0% | 10% | 0% |
| 0 | 100 | 0.19 | 0.43 | 0.05 | 0.09 |
| 100 | 20 | 5.6 | >60 | 2.4 | 17 |
| 100 | 25 | 1.1 | 5.1 | 0.87 | 2.8 |
| 100 | 30 | 0.5 | 1.8 | 0.4 | 1.1 |
| 100 | 40 | 0.2 | 0.5 | 0.12 | 0.29 |
| 100 | 30* | 0.5 | 1.9 | 0.3 | 0.8 |

*Injection molded

TABLE II

ELECTRICAL RESISTIVITY
PVC/POLYURETHANE 45

| Polyurethane 45 Wt. Pts./ 100 Wt. Pts. PVC | Surface Resistivity Ohms/sq | Volume Ohms-cm |
|---|---|---|
| 20 | $4.8 \times 10^{13}$ | $2.8 \times 10^{13}$ |
| 25 | $3.0 \times 10^{12}$ | $1.5 \times 10^{13}$ |
| 30 | $1.2 \times 10^{13}$ | $2.8 \times 10^{12}$ |
| 40 | $4.8 \times 10^{11}$ | $1.5 \times 10^{12}$ |

EXAMPLE 8

The chain extended polymer of Example 2 (polyurethane 45) was blended with several resins, CPVC, ABS, polystyrene, and a vinyl chloride/acrylate copolymer using the procedure described in Example 6A. The blends contain 30 parts by weight of polyurethane 45 per 100 parts of the matrix polymer except for the polystyrene sample which contained 100 parts by weight of polyurethane 45 per 100 parts of the matrix polymer. These blends were compression molded and the static decay was measured. The results are summarized in Table III below.

TABLE III

Polyurethane 45
30 Parts by Weight Per 100 Parts by Weight of Matrix Polymer

| Matrix Polymer | STATIC DECAY Seconds | | | |
|---|---|---|---|---|
| | 15% RH | | Unconditioned | |
| | 10% | 0% | 10% | 0% |
| CPVC[1] | 0.04 | 0.45 | 0.02 | 0.03 |
| ABS[2] | 0.09 | 0.20 | * | * |

TABLE III-continued

Polyurethane 45
30 Parts by Weight Per 100 Parts by Weight of Matrix Polymer

| Matrix Polymer | STATIC DECAY Seconds | | | |
|---|---|---|---|---|
| | 15% RH | | Unconditioned | |
| | 10% | 0% | 10% | 0% |
| Polystyrene[3] (100 phr) | 1.14 | 2.89 | 1.03 | 2.78 |
| Acrylate[4] Copolymer | 0.5 | 1.89 | 0.25 | 0.80 |
| PVC (resin) | 0.5 | 1.8 | 0.4 | 1.1 |

[1]Chlorinated PVC sold as Temprite 3504 by The B. F. Goodrich Company.
[2]Acrylonitrile/Butadiene/Styrene polymer sold as Abson 820X17 by General Electric.
[3]Gulf MC-2100.
[4]Injection molded.
*Not Measured

EXAMPLE 9

Several chain extended polymers were prepared polyurethane 45, polyurethane 56, polyurethane 64 and polyurethane 72 each having 45, 56, 64 and 72 percent ethylene oxide oligomer, respectively. Compositions were prepared using polyvinyl chloride and each of the polyurethanes. These blends contained 30 parts by weight of the respective polyurethane per 100 parts by weight of PVC. These blends were compression molded and the static delay was measured. The results are summarized in Table IV below.

TABLE IV

POLYURETHANES
30 Wt. Parts Polyurethane/100 Wt. Parts PVC

| Compound | STATIC DECAY Seconds | | | |
|---|---|---|---|---|
| | 15% RH | | Unconditioned | |
| | 10% | 0% | 10% | 0% |
| Polyurethane 45 | 0.5 | 1.8 | 0.4 | 1.1 |
| Polyurethane 56 | 0.4 | 1.3 | 0.4 | 1.4 |
| Polyurethane 64 | 1.4 | 6.4 | 0.8 | 2.1 |
| Polyurethane 72 | 1.4 | 3.3 | 0.3 | 1.0 |
| PVC | * | * | * | * |

*Insulator

EXAMPLE 10

Polyvinyl chloride (PVC) and several test plaques containing blends of 100 parts PVC and 30 parts ESD (antistatic) additives were prepared. The ESD additives compared were polyurethane 45, polyurethane 56, and a commercial ethylene oxide-epichlorohydrin (EO-ECH) copolymer. Also, a test plaque of a blend of 100 parts of vinyl chloride/acrylate copolymer and 30 parts polyurethane 45 was prepared. These plaques were compared for light transmission and percent haze. The results obtained show that haze can be reduced and light transmission increased when the refractive index of the two materials has been properly matched. Further, the results show that the commercially available antistatic materials are not suitable for clear applications. The results for percent light transmission were as measured according to ASTM D-1003 and for percent haze as measured using a Hunterlab model D-54P-5 spectrophotometer or equivalent. The results are summarized in Table V.

TABLE V

| | LIGHT TRANSMISSION ASTM D-1003 | |
|---|---|---|
| Sample | % Transmission | % Haze |
| PVC (Control) | 85.8 | 10.6 |
| PVC/Polyurethane 45 | 80.1 | 67.7 |
| Copolymer Resin/ Polyurethane 45 | 64.0 | 48.3 |
| PVC/Polyurethane 56 | 73.4 | 40.5 |
| PVC/EO-ECH Copolymer | 42.7 | 98.3 |

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. An electrostatic dissipative polymeric composition comprising:
   (I) from about 3 parts to about 100 parts by weight of a chain extended polymer having electrostatic dissipative properties said chain extended polymer consisting essentially of:
   (A) a low molecular weight polyether oligomer having two reactive moieties which are hydroxyl group and an average molecular weight from about 200 to about 10,000 wherein the oligomer is a homopolymer of ethylene oxide or a copolymer of ethylene oxide and at least one other copolymerizable cyclic ether monomer having the formula:

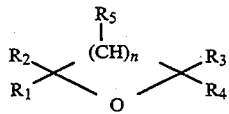

wherein
   $R_1$, $R_2$, $R_3$, $R_4$, and $R_5$ are independently hydrogen, unsubstituted or substituted alkyl, alkenyl, cycloalkyl, cycloalkenyl, aryl, aralkyl or alkaryl, the substituents are $OR_6$, $SR_6$, $CN$, $COOR_6$, or halogens;
   $R_6$ is hydrogen, alkyl, alkenyl, cycloalkyl, cycloalkenyl, aryl, aralkyl, alkaryl, or carboxyl; and
   n is 0, 1, 2, or 4;
   (B) from about 0 moles to about 35 moles of a modifier, wherein said modifier is a diol for each mole of low molecular weight polyether; and
   (C) a diisocyanate chain extender; with the proviso that the number of moles of chain extender per mole of the sum of the number of moles of low molecular weight polyether oligomer plus the number of moles of modifier is from about 0.95 to about 1.06; and
   (II) 100 parts by weight of at least one matrix polymer;
wherein said composition will be essentially free of amine or ammonium groups.

2. The electrostatic dissipative composition of claim 1 wherein the number of moles of chain extender per total number of moles of the low molecular weight polyether oligomer plus the total number of moles of the modifier is from about 0.97 to about 1.03.

3. The electrostatic dissipative composition of claim 1 wherein the modifier is 1,4-butane diol.

4. The electrostatic dissipative composition of claim 1 wherein the copolymerizable monomer is propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

5. The electrostatic dissipative composition of claim 1 wherein the diisocyanate is 4,4'-methylenebis(phenyl isocyanate).

6. The electrostatic dissipative polymeric composition of claim 1 having from about 5 parts to about 35 parts by weight of the chain extended polymer per 100 parts by weight of the matrix polymer.

7. The composition of claim 1 wherein the chain extended polymer is a solid material at room temperature having melt indices from about 0.05 grams to about 110 grams per 10 minutes.

8. The composition of claim 7 wherein the chain extended polymer is a solid material at room temperature having melt indices from about 1.0 grams to about 65 grams per 10 minutes.

9. The composition of claim 1 wherein the matrix polymer is:
   polyvinyl chloride; chlorinated polyvinyl chloride; a terpolymer of styrene, acrylonitrile, and diene rubber; a copolymer of styrene and acrylonitrile modified with acrylate elastomers; a copolymer of styrene and acrylonitrile modified with ethylene propylene diene monomer rubber; rubber modified impact polystyrene; thermoplastic polyester including polybutylene terephthalate, polyethylene terephthalate and polyether-ester block copolymer; polyphenylene oxide; polyacetal; polymethyl methacrylate; or mixtures thereof.

10. The polymeric composition of claim 9 wherein the matrix polymer is polyvinyl chloride.

11. The polymeric composition of claim 9 wherein the matrix polymer is a copolymer comprising styrene, acrylonitrile, and diene rubber.

12. The polymeric composition of claim 9 wherein the matrix polymer is a copolymer comprising a vinyl halide and an acrylate or methacrylate.

13. The electrostatic dissipative polymeric composition of claim 1 wherein the refractive index of the chain extended polymer is substantially matched to the refractive index of the matrix polymer.

14. The electrostatic dissipative polymeric composition of claim 1 wherein the composition is characterized by a high degree of clarity as defined by having:
   (I) a percent light transmission greater than 50% for a 20 mil film; and
   (II) a percent haze value less than 60% for a 20 mil film.

15. The electrostatic dissipative polymeric composition of claim 14 wherein the composition is characterized by a high degree of clarity as defined by having:
   (I) a percent light transmission greater than 70% for a 20 mil film; and
   (II) a percent haze value less than 30% for a 20 mil film.

16. The electrostatic dissipative polymeric composition of claim 14 wherein the composition is characterized by a high degree of clarity as defined by having:

(I) a percent light transmission greater than 80% for a 20 mil film; and
(II) a percent haze value less than 20% for a 20 mil film.

17. A polymeric article wherein the article is formed from the polymeric composition comprising:
(I) from about 3 parts to about 100 parts by weight of the chain extended polymer having electrostatic dissipative properties said chain extended polymer consisting essentially of:
(A) a low molecular weight polyether oligomer having two reactive moieties which are hydroxyl groups and an average molecular weight from about 200 to about 10,000 wherein the oligomer is a homopolymer of ethylene oxide or a copolymer, of ethylene oxide and at least one other copolymerizable cyclic ether monomer having the formula:

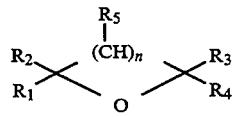

wherein
$R_1$, $R_2$, $R_3$, $R_4$, and $R_5$ are independently hydrogen, unsubstituted or substituted alkyl, alkenyl, cycloalkyl, cycloalkenyl, aryl, aralkyl or alkaryl, the substituents are $OR_6$, $SR_6$, $CN$, $COOR_6$, or halogens;
$R_6$ is hydrogen, alkyl, alkenyl, cycloalkyl, cycloalkenyl, aryl, aralkyl, alkaryl, or carboxyl; and
n is 0, 1, 2, or 4;
(B) from about 0 moles to about 35 moles of a modifier, wherein said modifier is a diol for each mole of low molecular weight oligomer; and
(C) a diisocyanate chain extender; with the proviso that the number of moles of chain extender per mole of the sum of the number of moles of low molecular weight polyether oligomer plus the number of moles of modifier is from about 0.95 to about 1.06; and
(II) 100 parts by weight of at least one matrix polymer;
wherein said composition will be essentially free of amine or ammonium groups.

18. The article of claim 17 wherein the matrix polymer is a polyvinyl chloride homopolymer or copolymer.

19. The article of claim 17 wherein said article is selected from the group consisting of a film, tube, paper tray, machine housing, tote bin and floor tile.

20. A process for preparing an electrostatic dissipative polymeric composition comprising the step of:
(I) adding an effective amount of a chain extended polymer to at least one matrix polymer said chain extended polymer having electrostatic dissipative properties and said chain extended polymer consisting essentially of:
(A) a low molecular weight polyether oligomer having two reactive moieties which are hydroxyl groups and an average molecular weight from about 200 to about 10,000 wherein the oligomer is a homopolymer of ethylene oxide or a copolymer of ethylene oxide and at least one other copolymerizable cyclic ether monomer having the formula:

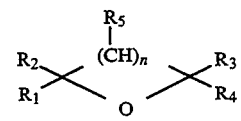

wherein
$R_1$, $R_2$, $R_3$, $R_4$, and $R_5$ are independently hydrogen, unsubstituted or substituted alkyl, alkenyl, cycloalkyl, cycloalkenyl, aryl, aralkyl or alkaryl, the substituents are $OR_6$, $SR_6$, $CN$, $COOR_6$, or halogens;
$R_6$ is hydrogen, alkyl, alkenyl, cycloalkyl, cycloalkenyl, aryl, aralkyl, alkaryl, or carboxyl; and
n is 0, 1, 2, or 4;
(B) from about 0 moles to about 35 moles of a modifier, wherein said modifier is a diol, for each mole of low molecular weight polyether; and
(C) a diisocyanate chain extender; with the proviso that the number of moles of chain extender per mole of the sum of the number of moles of low molecular weight polyether oligomer plus the number of moles of modifier is from about 0.95 to about 1.06;
(II) mixing the matrix polymer and the chain extended polymer to produce the electrostatic dissipative composition.

21. The process of claim 20 wherein the amount of chain extended polymer is from about 3 parts to about 100 parts by weight and the matrix polymer is 100 weight parts.

22. The process of claim 20 wherein the matrix polymer is:
polyvinyl chloride; chlorinated polyvinyl chloride; a terpolymer of styrene, acrylonitrile, and diene rubber; a copolymer of styrene and acrylonitrile modified with acrylate elastomers; a copolymer of styrene and acrylonitrile modified with ethylene propylene diene monomer rubber; rubber modified impact polystyrene; thermoplastic polyester including polybutylene terephthalate, polyethylene terephthalate and polyether-ester block copolymer; polyphenylene oxide; polyacetal; polymethyl methacrylate; or mixtures thereof.

23. The process of claim 27 wherein the matrix polymer is a polyvinyl chloride homopolymer or copolymer.

24. A clear polyvinyl chloride composition comprising polyvinyl chloride and an effective amount of an electrostatic dissipative additive said composition having one of the following electrical properties:
(a) surface resistivity of $1 \times 10^{14}$ Ohms/sq, or less as measured according to ASTM D-257; or
(b) volume resistivity of $1 \times 10^{14}$ Ohms-cm or less as measured according to ASTM D-257; and, having the following optical properties:
(I) a percent light transmission greater than 50% for 20 mil film; and
(ii) a percent haze value less than 60% for a 20 mil film; wherein said electrostatic dissipative additive consists essentially of:
(A) a low molecular weight polyether oligomer having two reactive moieties which are hydroxyl groups (OH) and an average molecular weight of from about 200 to about 10,000 wherein the oligomer is a homopolymer of ethylene oxide or a copolymer of ethylene oxide and at least one other copolymerizable cyclic ether monomer having the formula:

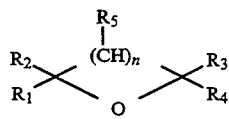

wherein $R_1$, $R_2$, $R_3$, $R_4$, and $R_5$ are independently hydrogen, unsubstituted or substituted alkyl, alkenyl, cycloalkyl, cycloalkenyl, aryl, aralkyl, or a alkaryl, the substituents are $OR_6$, $SR_6$, CN, $COOR_6$, or halogens;

$R_6$ is hydrogen, alkyl, alkenyl, cycloalkyl, cycloalkenyl, aryl, aralkyl, alkaryl, or carboxyl; and n is 0, 1, 2, or 4;

(B) from about 0 moles to about 35 moles of a modifier, wherein said modifier is a diol, for each mole of low molecular weight polyether; and (C) a diisocyanate chain extender; with the proviso that the number of moles of chain extender per mole of the sum of the number of moles of low molecular weight polyether oligomer plus the number of moles of modifier is from about 0.95 to about 1.06.

25. The electrostatic dissipative polymeric composition of claim 24 wherein said composition has the following electrical properties:
(a) surface resistivity of $1 \times 10^{14}$ Ohms/seq or less and;
(b) volume resistivity of $1 \times 10^{14}$ Ohms-cm or less.

26. The electrostatic dissipative polymeric composition of claim 24 wherein said composition has the following electrical property:
(a) surface resistivity of $1 \times 10^{13}$ Ohms/sq or less.

27. The electrostatic dissipative polymeric composition of claim 29 wherein the polyvinyl chloride is a homopolymer or a copolymer.

28. An electrostatic dissipative polymeric composition comprising:
(I) from about 3 parts to about 100 parts by weight of the chain extended polymer having electrostatic dissipative properties said chain extended polymer consisting essentially of:

(A) a low molecular weight polyether oligomer having two reactive moieties which are hydroxyl groups and an average molecular weight from about 200 to about 10,000 wherein the oligomer is a homopolymer of ethylene oxide or a copolymer of ethylene oxide and at least one other copolymerizable cyclic ether monomer having the formula:

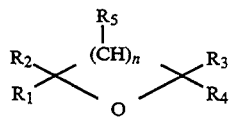

wherein $R_1$, $R_2$, $R_3$, $R_4$, and $R_5$ are independently hydrogen, unsubstituted or substituted alkyl, alkenyl, cycloalkyl, cycloalkenyl, aryl, aralkyl or alkaryl, the substituents are $OR_6$, $SR_6$, CN, $COOR_6$, or halogens;

$R_6$ is hydrogen, alkyl, alkenyl, cycloalkyl, cycloalkenyl, aryl, aralkyl, alkaryl, or carboxyl; and n is 0, 1, 2, or 4;

wherein said low molecular weight polyether oligomer is end capped with ethylene oxide or ethylene imine thereby providing an oligomer having two primary moieties;

(B) from about 0 moles to about 35 moles of a modifier, wherein said modifier is a diol for each mole of low molecular weight polyether; and (C) a diisocyanate chain extender; with the proviso that the number of moles of chain extender per mole of the sum of the number of moles of low molecular weight polyether oligomer plus the number of moles of modifier is from about 0.95 to about 1.06;

(II) 100 parts by weight of at least one matrix polymer;

wherein said composition will be essentially free of amine or ammonium groups.

29. The electrostatic dissipative composition of claim 28 wherein the number of moles of chain extender per total number of moles of the low molecular weight polyether oligomer and the modifier is from about 0.97 to about 1.03.

30. The electrostatic dissipative composition of claim 28 wherein the diisocyanate is 4,4'-methylenebis(phenyl isoycanate).

* * * * *